Patented June 1, 1954

2,680,063

UNITED STATES PATENT OFFICE 2,680,063

CHEMICAL HEATING COMPOSITION

Philip J. Shapiro, Asbury Park, N. J., assignor to the United States of America as represented by the Secretary of the Army No Drawing. Application January 21, 1952,
Serial No. 267,493

3 Claims. (Cl. 44—3)

(Granted under Title 35, U. S. Code (1952), sec. 266)

This invention, if patented, may be manufactured and used by and for the Government for governmental purposes without the payment to me of any royalties thereon.

This invention relates generally to thermophoric heating compositions in which heat is generated by exothermic reaction when a liquid such as water is added to a finely divided composition, including the various constituent elements in proper proportion and size to provide heat within the critical range of temperatures and for the period of time desired for the particular use intended, such for example as in an article of clothing for military or civilian use.

More particularly, this invention relates to the problem of providing a thermophoric composition having certain definite control properties within specific critical limits and ranges of average temperature between about 100° to 120° F., and having certain properties which assure continuance of the exothermic source of heat at such a rate as to maintain a uniform average temperature within the critical range of from 100 to 120° F. continuously for a period of time designated as a "run" of as much as 50 hours consecutively. To be economically and commercially practical the composition must be capable of use for a number of "runs" conforming to the specified standard requirements, before the chemical constituents become exhausted and incapable of initiating any additional "run" period.

A further object is to provide a thermophoric composition which is particularly suitable for embodiment in the fabrication of articles of clothing as a light, compact replaceable unit or element as a heating pad or lining which can be rendered reactive to produce exothermic heat reaction by a suitable structure and arrangement in which the layer or film of the thermophoric composition has been uniformly distributed to produce an article which is greatly superior to the best commercial form of heating pad presently available on the market for general heating purposes.

A further object is to provide a thermophoric composition comprising certain constituent elements in such proportions that, upon reaction with water of a controlled amount, they will produce an exothermic reaction within a relatively low range of temperature of from 100° to 120° F. uniformly for a sustained period as a "run" for a period of about 50 hours, the actual extent of said period being variable and under control of a predetermined quantity of water.

It has been discovered that the particular quantity of liquid used under given conditions as to blend and quantities of the constituents of the thermophoric mixture is a factor which effects a controlling influence in determining the duration of any particular "run" and also the total duration of a number of "runs," from a given quantity of the mixture in certain proportions before the composition becomes exhausted and incapable of further use. The duration or time period of the "run" may be varied from the maximum of say over 50 hours to a less period by varying the quantity of water. This may be done without changing the critical average temperature range of the reaction. If other ingredients than the water were changed, as to proportions used, this would not be true.

The oxidizing constituent which comprises about 10% of the total thermophoric composition, includes a number of oxidizing constituents which serve to control the rate of oxidation, the average temperatures attained, the duration of any particular "run," the total number of "runs" and the total duration in time throughout all of the "runs," during which an average temperature range of from about 100 to 130° F. is maintained during the delivery of a certain amount of useful heat energy.

An example of the improved thermophoric composition (reacting with water and having certain definite control properties within specific critical limits and ranges of average temperature of between about 100° to 120° F. for a period of time designated as a "run" of from about 25 to 58 hours, consecutively, for a repeated number of such "runs," and adapted for use in an article of apparel such as a uniform, either for military or civilian use) is as follows:

Per cent by weight of the thermophoric composition

I. Oxidizable constituent: finely divided particles of iron (blended in graded mesh sizes from 15 to 150 mesh per inch)_____ 90

II. Oxidizing constituents:
  (1) Potassium chloride (sylvite), KCl, about_____ 4.3
  (2) Cupric chloride (anhydrous), CuCl₂, about____ 2.2
  (3) Potassium permanganate, KMnO₄, about_____ 1.7
  (4) Cupric oxide, CuO, about_____ 1.3
  (5) Potassium chlorate, KClO₃, about_____ 0.5
                                                      10
                                                      100

The range of the blended and graded mesh sizes of the oxidizable finely divided iron filings (degreased), within a range of mesh sizes of from 15 to 150 mesh per inch, is as follows:

Iron filings:                 Per cent by wgt. of entire comp.
  15 to 50 mesh_____ 30
  50 to 100 mesh_____ 30
  100 to 150 mesh_____ 30
                                                         90

A series of experiments demonstrated that an optimum range of mesh size, is from 15 to 150 mesh size for the iron filings. At this point the average duration of a "run" and the total duration is a maximum value.

The remaining 10% is made up of the finely divided particles, of the five constituents, above-identified, which comprises, what has been generally referred to as the oxidizing composition in their natural finely-divided particle size. The constituents include potassium chloride about 43%, cupric chloride about 22%, potassium permanganate about 17%, cupric oxide about 13%, and potassium chlorate about 5% by weight of the oxidizing composition.

The term "oxidizing composition" as applied to the five constituents is not intended to mean or imply that each of the five provides oxygen, as the prime source, of the heat evolving exothermic reaction as it is clear that two of such constituents, such as potassium chloride (KCl) and cupric chloride (anhydrous) ($CuCl_2$) do not contain oxygen. However, it is known in general chemistry that chlorine, sulfur and other constituents under certain conditions do react in a manner comparable to oxygen. Three of the constituents; i. e., potassium permanganate ($KMnO_4$), cupric oxide (CuO), and potassium chlorate ($KClO_3$) do contain oxygen and under favorable conditions may serve as a source of nascent oxygen in a reaction independent of and apart from any oxygen ($O_2$) from the atmosphere. In any such reaction the oxygen native to the composition may exert a more active part in what has been recognized and termed when released or newly formed in a reaction as being in a "nascent state," favorable for reaction with the elements for which it has an affinity.

The effect of the addition of various amounts of water to the above thermophoric composition is set forth in the following table which is based on a series of experiments carried out by placing 100 grams of the composition into double bags having an inner bag of cloth impregnated with reclaimed rubber, and an outer bag of sized canvas.

| Volume (ml.) of Water added per run | No. of Runs Producing a Temperature Above 100° F. | Average Duration of Run | | Average Temperature above 100° F. | Total Duration Above 100° F. | |
| --- | --- | --- | --- | --- | --- | --- |
| | | hrs. | min. | | hrs. | min. |
| 2 | 13 | 5 | 32 | 118 | 72 | 30 |
| 3 | 9 | 8 | 06 | 118 | 72 | 50 |
| 4 | 8 | 9 | 50 | 121 | 71 | 00 |
| 6 | 7 | 10 | 31 | 120 | 73 | 35 |
| 8 | 4 | 22 | 03 | 119 | 87 | 70 |
| 10 | 4 | 19 | 10 | 117 | 77 | 30 |

These data show that the effect of varying the volumes of water is quite pronounced. As the volume of water is increased, the number of runs decreases. The average temperature maintained is not affected significantly. The total duration of heat production is fairly constant up to and including the use of 6 ml. of water, increases significantly when 8 ml. of water are used, and decreased again with 10 ml. of water. The preferred proportion of water for activating my thermophoric composition thus is between 6 and 10 ml. of water per 100 grams of composition, and optimum volume of water is 8 ml. per 100 grams of thermophoric composition.

The potassium chlorate component of the oxidizing composition causes a sharp initial rise in temperature from the ambient temperature; however, the amount of potassium chlorate must be kept small in order that the desired body-warming temperature may remain within the desired range. The other two oxygen-containing components of the oxidizing composition, potassium permanganate and cupric oxide, evolve a much less intensive heat in the thermophoric composition, but prolong the action of the composition and keep it within the desired temperature range for warming a human body.

By using the commercial forms of compositions known as the basis of comparison, experimentation has demonstrated the superiority of the improved compositions disclosed herein as being suitable for use in the fabrication of low temperature Army uniforms. The composition in an amount of 100 grams is activated by the addition of 8 ml. of water. 454 g. of such a composition, upon activation, will produce heat at an average temperature of about 111° F. for over 58 hours consecutively. The compositions can be revived for 5 periods or "runs," thus generating heat for a total of over 290 hours. If shorter runs are desired, smaller volumes of water are added.

It will be seen from the foregoing that I have provided a water activated thermophoric composition adapted for use to maintain an average temperature within the range of from about 100° F. to about 120° F. in an article of clothing over an extended period of time, which includes oxidizable iron and iron oxide particles of graduated mesh size, and potassium chloride, cupric chloride, potassium permanganate, cupric oxide and potassium chlorate as oxidizing agents. By properly proportioning the various mesh sizes of the oxidizable iron and iron oxide particles and the quantities of oxidizing agents, in accordance with the present invention, it is possible to obtain a chemical heat pad which provides upon addition of between 6 and 10 ml. (optimum 8 ml.) of water 100 grams of composition a temperature of from about 100 to about 120° F. over a prolonged period of time.

I prefer to have the oxidizable iron particles present in a proportion of about 90% and the oxidizing agents in a proportion of about 10% by weight of the composition; however, when it is desired to provide a higher temperature, the proportion of oxidizing agents may be increased somewhat above 10%, and if maintenance of a lower temperature than 100° F. is desired, the proportion of oxidizable iron and iron oxide particles may be increased somewhat above 90%.

I claim:

1. A water activated thermophoric composition adapted to maintain an average temperature within a range of from about 100° F. to about 120° F. over an extended period of time, said composition comprising about 90% iron particles, and an oxidizing mixture, said oxidizing mixture including, per 10 parts by weight, potassium chloride about 4.3 parts, cupric chloride about 2.2 parts, potassium permanganate about 1.7 parts, cupric oxide about 1.3 parts, potassium chlorate about .5 part.

2. A composition according to claim 1, wherein the size of said iron particles is from about 15 to about 150 mesh.

3. A water activated thermophoric composition adapted to maintain an average temperature within a range of from about 100° F. to about 120° F. over an extended period of time, said composition comprising about 90% iron particles, about one third by weight of said particles having a size from about 15 to about 50 mesh, about one third of said particles having a size from about 50 to about 100 mesh, and about one third of said particles having a size from about 100 to about 150 mesh; and an oxidizing mixture, said oxidizing mixture including, per 10 parts by weight, potassium chloride about 4.3 parts, cupric chloride about 2.2 parts, potassium permanganate about 1.7 parts, cupric oxide about 1.3 parts, potassium chlorate about .5 part.

References Cited in the file of this patent

UNITED STATES PATENTS

| Number | Name | Date |
|---|---|---|
| 1,502,744 | Perrault | July 29, 1924 |
| 1,609,958 | Perrault | Dec. 7, 1926 |
| 1,613,120 | O'Neal et al. | Jan. 4, 1927 |
| 1,910,874 | Ziegler et al. | May 23, 1933 |
| 1,978,388 | Reed | Oct. 23, 1934 |

FOREIGN PATENTS

| Number | Country | Date |
|---|---|---|
| 135,336 | Australia | Nov. 10, 1933 |